Figure 3:
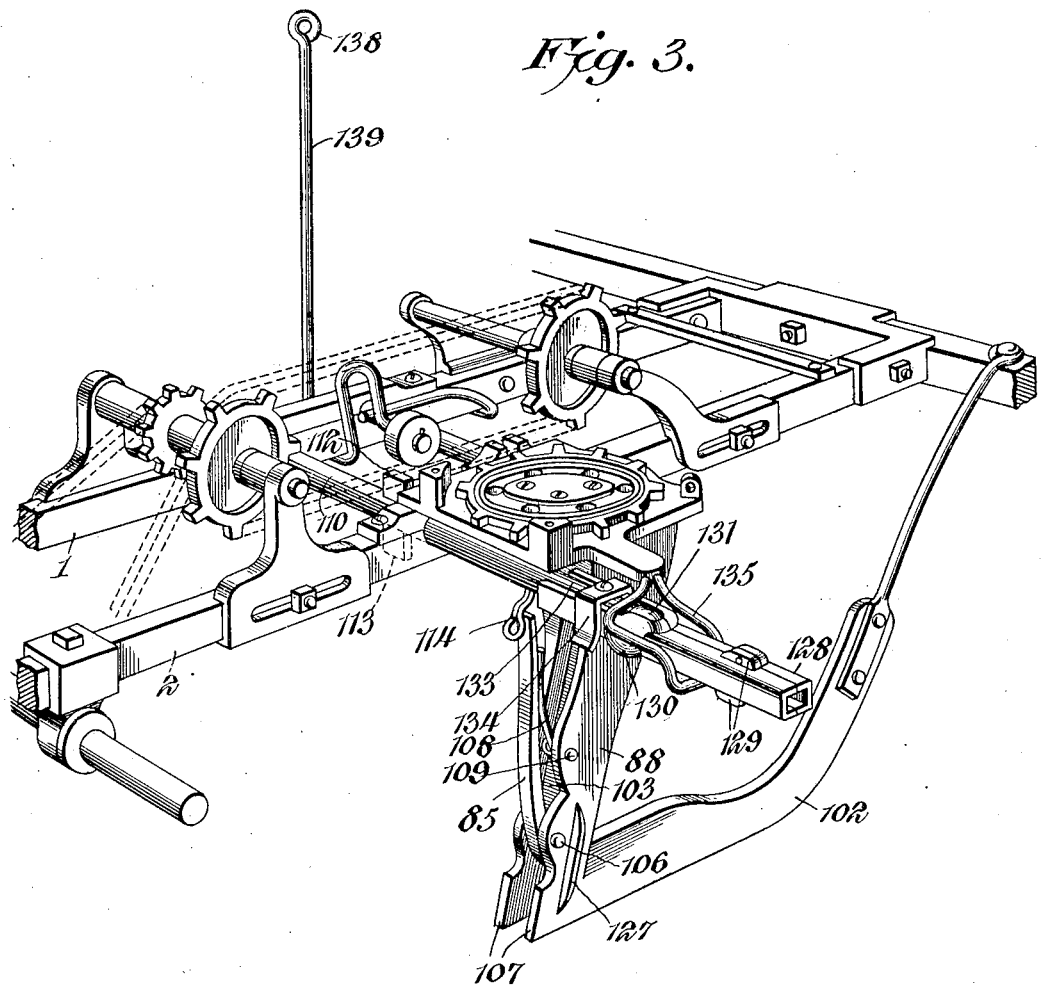

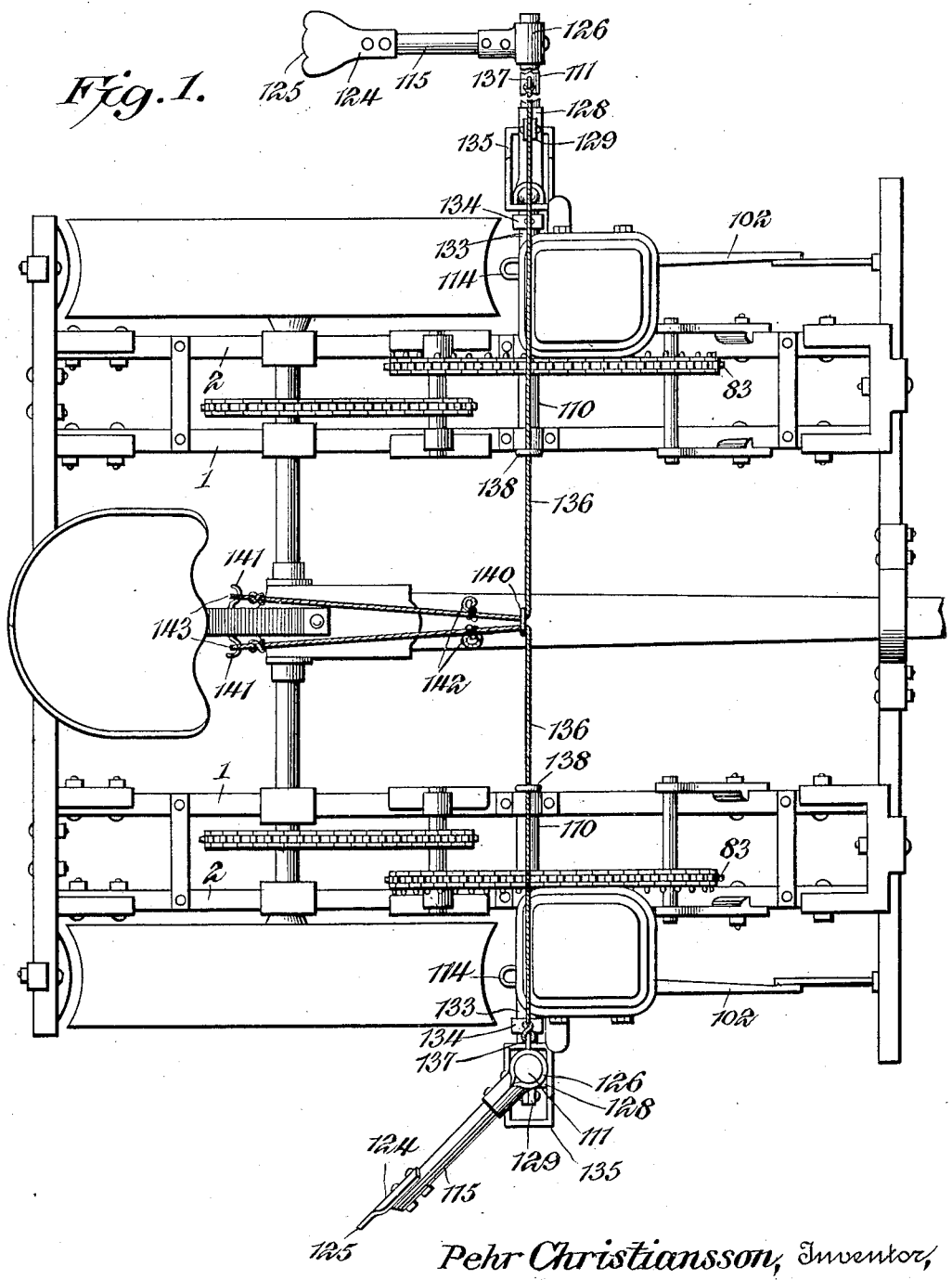

No. 876,296.
PATENTED JAN. 7, 1908.
P. CHRISTIANSSON.
HILL MARKER.
APPLICATION FILED JUNE 4, 1907.
3 SHEETS—SHEET 2.
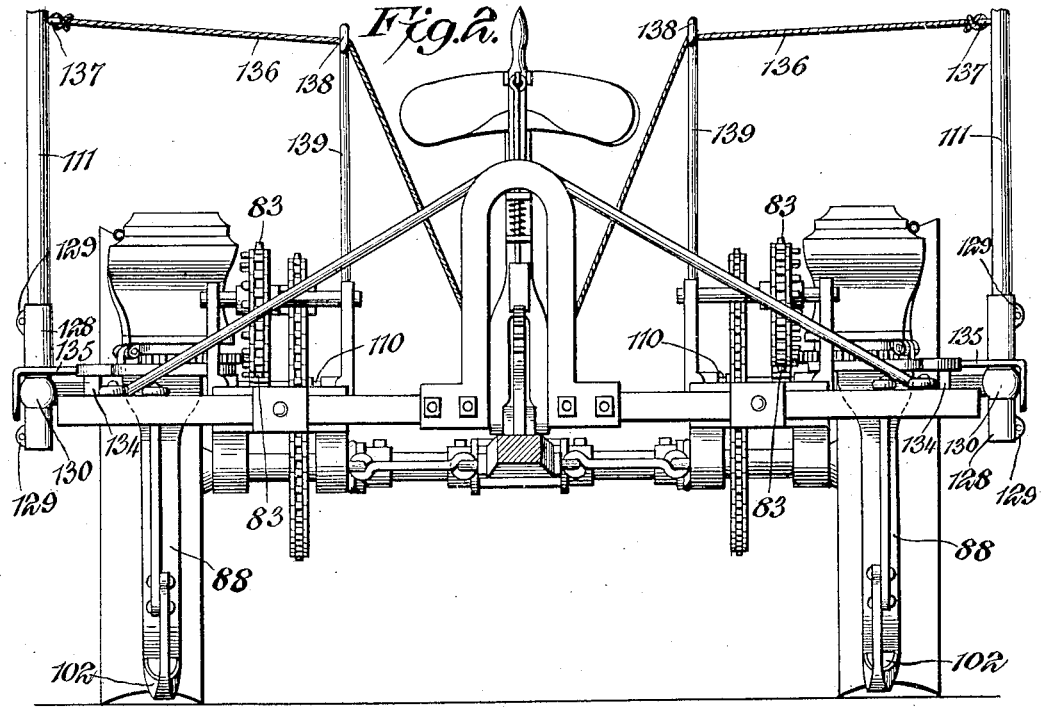
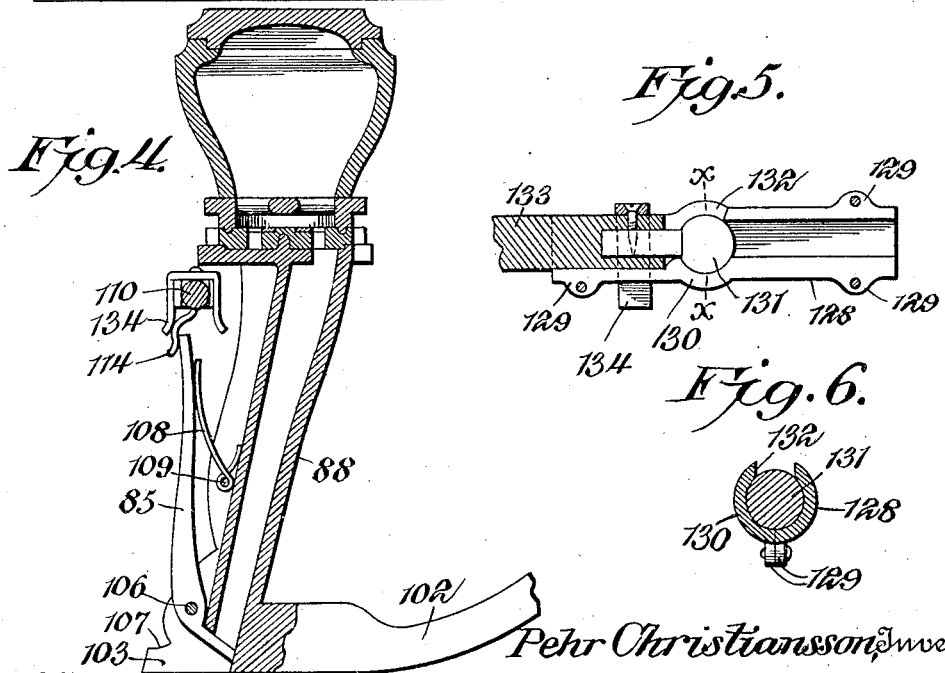
Witnesses
Howard N. Orr
H. F. Riley
Pehr Christiansson, Inventor,
By E. G. Siggers
Attorney No. 876,296.

PATENTED JAN. 7, 1908.

P. CHRISTIANSSON.
HILL MARKER.
APPLICATION FILED JUNE 4, 1907.

3 SHEETS—SHEET 3.

Witnesses
Howard D. Orr.
J. F. Riley

Pehr Christiansson Inventor,
By E. G. Siggers
Attorney

UNITED STATES PATENT OFFICE.

PEHR CHRISTIANSSON, OF CARLOS, MINNESOTA.

HILL-MARKER.

No. 876,296.     Specification of Letters Patent.     Patented Jan. 7, 1908.

Original application filed July 6, 1906, Serial No. 324,982. Divided and this application filed June 4, 1907. Serial No. 377,206.

*To all whom it may concern:*

Be it known that I, PEHR CHRISTIANSSON, a citizen of the United States, residing at Carlos, in the county of Douglas and State of Minnesota, have invented a new and useful Hill-Marker, of which the following is a specification.

The invention relates to a hill marker, and is a division of the application filed by me on the sixth day of July, 1906, Serial No. 324,982, and is designated for use in connection with the corn planter, shown and described in said application.

The object of the present invention is to improve the construction of hill markers, and to provide a simple and comparatively inexpensive hill marker, adapted for use on machines to be driven continuously back and forth across the land, and capable of marking at the end of each row the point where the first hill of the next row is to be planted.

With these and other objects in view, the invention consists in the construction and novel combination of parts hereinafter fully described, illustrated in the accompanying drawings, and pointed out in the claims hereto appended; it being understood that various changes in the form, proportion, size and minor details of construction, within the scope of the claims, may be resorted to without departing from the spirit or sacrificing any of the advantages of the invention.

In the drawings:—Figure 1 is a plan view showing markers, constructed in accordance with this invention and arranged at the opposite sides of a corn planter. Fig. 2 is a front elevation. Fig. 3 is an enlarged perspective view, illustrating the hill marker and the second drop of the seed tube. Fig. 4 is an enlarged vertical sectional view, illustrating the arrangement of the hill marker with relation to the second drop. Fig. 5 is an enlarged detail sectional view, taken longitudinally of the hill marker shaft. Fig. 6 is a transverse sectional view on the line x—x of Fig. 5.

Like numerals of reference designate corresponding parts in all the figures of the drawings.

The seed tube 88 at each side of the machine is connected at its lower end with a runner or shoe 102, having a slotted or bifurcated rear end 103 and adapted to plow a furrow or groove into which the seed is dropped. The discharge of seed from the seed tube into the furrow is controlled by a second dropping device, consisting of the lever 85, fulcrumed near its lower end on a transverse pivot 106. The lower arm of the lever is short and is normally arranged at an inclination, as clearly illustrated in Fig. 4 of the drawings. The seed tube is provided with rearwardly extending spaced flanges or portions 107, which form a recess for the lever 85, and the latter is normally maintained in a closed position by a spring 108. The spring 108, which may be of any preferred construction, is arranged within the space between the upper end of the lever and the seed tube, being mounted on a pin or rivet 109, which pierces the flanges 107. The spring is provided between its ends with an eye to receive the said pin or rivet 109, and it has a short arm to bear against the back of the seed tube. The other arm of the spring engages the lever 85 and is adapted to throw the upper end rearwardly.

The seed dropping lever or cut-off 85 is oscillated by a hill marking rock shaft, consisting of an inner section 110 and an outer section 111. The inner section 110 is journaled in suitable bearings of the inner and outer side beams 1 and 2, and it is provided with oppositely projecting tappets 112 and 113, which are normally arranged in a substantially vertical position. The upwardly projecting tappet 112 is arranged in the path of the lugs 83 of the front sprocket chains of the machine of the said application, and it is adapted to be engaged by the same, whereby the shaft is partially rotated. The shaft is partially rotated to swing a short arm 114 forwardly to operate the lever 85, which constitutes a second drop and also to throw a marking arm 115 downwardly to mark the first hill of the next row, the hill markers being only used at the end of a row and being normally arranged in an elevated position, as illustrated in Fig. 2 of the drawings. Only one hill marker is used at a time, the one next the side of the unplanted land being swung downward for operation when the end of the row is reached.

The marker arm 115, which is normally arranged at an inclination, when the outer section of the marker shaft is horizontal, extends downwardly and rearwardly from the outer end of the marker shaft and it is swung downwardly and rearwardly, when the marker shaft is operated. The engaging end of the marker shaft is provided with a substantially spoon-shaped marking blade 124, which has a corrugated scalloped lower edge 125, forming a plurality of projecting portions to enable the marker arm to make a distinct mark on the land to indicate the first hill of the next row. The marking blade is provided with a shank, which is secured to the marking arm 115, and the latter is connected with the outer end of the marker shaft by means of a collar 126, provided with depending extensions, which embrace the marker arm and form a socket for the same. The collar 126 is adjustably secured to the section 111 by means of a screw, or other suitable fastening device and it is adapted to be moved inwardly or outwardly on the said section 111 to arrange the hill marking arm the given distance from the side of the machine to correspond to the width of the rows.

A fixed indicator 127 consisting of a rib or flange is formed integral with the seed tube and is arranged at a slight inclination at the outer side thereof. This indicating flange or rib is placed at the mark made by the hill marker and the seed will be deposited the proper distance from the row previously planted.

The hinged outer section of the marker shaft is connected with the inner section by a partial ball and socket joint, the inner end of the outer section being provided with a longitudinal box or casing 128, composed of two longitudinal sections secured together by rivets, or other suitable fastening devices, which are arranged in bifurcated ears or flanges 129. The box or casing forms a sleeve to receive the inner end of the outer section 111, and it is provided at an intermediate point with a socket 130, receiving and conforming to the configuration of a ball 131, which is carried by the outer end of the section 110 and which forms a head for the same. The box or casing is provided at the top of the socket 130 with a slot or opening 132, which extends to the inner end of the box or casing and which permits the outer section 111 of the marker shaft to swing upwardly from a horizontal position to a vertical position. When the outer section of the marker shaft is arranged in a horizontal position, the inner slotted portion of the box or casing receives the outer end of the inner section 110 to form a rigid joint. The outer portion 133 of the inner section 110 is squared, and a yoke 134 is secured to the squared portion to assist in forming a stiff joint or coupling. The yoke consists of a top transverse portion and depending sides, which have flared or outwardly bent lower terminals to enable the inner end of the box or casing to readily enter the yoke. The transverse top portion of the yoke is pierced by a fastening device for securing the yoke to the squared inner section 110.

The outer hinged section 111 of the marker shaft is guided in its upwardly and downwardly swinging movements by means of a substantially L-shaped loop 135, consisting of an approximately horizontal portion and a depending vertical portion. The depending vertical portion of the loop-shaped guide 135 forms a stop and a rest for the outer section of the marker shaft, when the same is in a horizontal position, and the loop-shaped guide, which permits the outer section 111 to swing upwardly and downwardly, does not interfere with the rotary movement of the marker shaft and prevents the outer section from swinging longitudinally of the machine, when the former is raised. When the outer section is swung outwardly to a vertical position, the inner slotted portion of the box or casing 128 is carried out of the yoke and does not interfere with the oscillatory or partial rotary movement of the inner section 110, which is necessary to operate the seed dropping lever 85. The guides 135 are mounted on lateral extensions of the top of the seed tube.

The hinged outer sections 111 of the marker shafts are swung upwardly and are maintained in a vertical position by means of ropes 136, or other suitable fastening devices, secured at their outer ends to the hinged sections 111, which are provided at intermediate points with eyes 137. The flexible connections 136 extend from the outer sections of the marker shafts to guides 138 of standards 139, which are located at opposite sides of the machine and which are mounted on the inner bars or beams 1. The flexible connections then pass downwardly and inwardly in a direction transversely of the machine to a central guide 140, which is mounted on the tongue or draft beam. The inner terminals of the flexible connections are adapted to be secured to hooks 141, which are located at opposite sides of the spring standards of the seat. The inner terminal portions of the flexible connections 136 are provided with intermediate and terminal eyes 142 and 143; the terminal eye 143 of the flexible connection 136 is engaged with the hook 141, when the outer section 111 of the hill marker shaft is arranged in a horizontal position for operation, and the intermediate eye 142 is engaged with the hook 141 to hold the outer section 111 in an elevated position.

Having thus fully described my invention, what I claim as new and desire to secure by Letters Patent, is:—

1. The combination of a shaft, a hill marking arm extending from the shaft, and a blade secured to the arm and provided with a scalloped edge.

2. The combination of a shaft, a hill marking arm extending from the shaft, and a spoon-shaped blade provided at its engaging edge with a plurality of projecting portions.

3. The combination of a horizontal rock shaft, a hill marking arm extending downwardly and rearwardly from the shaft and arranged to be swung upwardly and downwardly into and out of engagement with the ground for marking the same by the rotary movement of the rock shaft, and means for actuating the shaft.

4. A machine of the class described provided at opposite sides with hinged hill marking devices embodying transverse rock shafts and marking arms, means for swinging the hill marking devices upward, and means for operating either of the hill marking devices.

5. In a machine of the class described, the combination of hinged hill marking devices located at opposite sides of the machine embodying transverse rock shafts and hill marking arms, means for operating either of the rock shafts, and flexible connections secured to the hill marking devices for raising and lowering the same.

6. In a machine of the class described, the combination of a frame, hinged hill marking devices located at opposite sides of the frame, means for operating the marking devices, standards located at opposite sides of the frame and provided with guides, flexible connections passing through the guides of the standards and connected with the hill marking devices for raising and lowering the same, and means for securing the flexible connections to hold the hill marking devices in their elevated position.

7. In a machine of the class described, the combination of a frame, a seat having a standard provided at opposite sides with hooks, a guide mounted on the frame in advance of the seat standard, side standards extending upward from the frame and provided at their upper ends with guides, hinged marking devices located at opposite sides of the frame, and flexible connections secured to the marking devices and passing through the said guides and provided with intermediate and terminal means for engaging the said hooks to hold the hill marking devices in a raised position.

8. In a machine of the class described, the combination of a rock shaft composed of inner and outer sections hinged together, a hill marking arm carried by the outer section, means for swinging the outer section upwardly out of the way, and operating mechanism for actuating the inner section.

9. In a machine of the class described, the combination of a shaft composed of inner and outer sections, the inner section being provided with a ball, a socket carried by the outer section and receiving the ball and provided with a recess or opening to permit the outer section to swing at an angle to the inner section, a hill marking arm carried by the outer section, and means for actuating the inner section.

10. In a machine of the class described, the combination of a shaft composed of inner and outer sections, the inner section being provided with a ball, a box or casing receiving the outer section and provided with a socket for the reception of the ball and having an extended slotted portion embracing the inner section, when the outer section is in alinement with the same, a marking arm carried by the outer section, and means for actuating the inner section.

11. In a machine of the class described, the combination of a shaft composed of inner and outer sections, the inner section having a ball, a sectional casing receiving the outer section and provided at a point between its ends with a socket and having its inner portion slotted to receive the inner section, when the outer section is in alinement with the same, and a yoke carried by the inner section and arranged to receive the slotted portion of the casing, a marking arm carried by the outer section of the shaft, and means for actuating the inner section of the same.

12. In a machine of the class described, the combination of a shaft composed of inner and outer sections hinged together, a marking arm carried by the outer section, means for actuating the inner section, and a guide receiving the outer section and forming a support for the same when the said outer section is in alinement with the inner section.

13. In a machine of the class described, the combination of a shaft composed of inner and outer sections hinged together, a marking arm carried by the outer section, means for actuating the inner section, and a guide consisting of an approximately L-shaped loop receiving the outer section and forming a support for the same when the said outer section is in alinement with the inner section.

In testimony, that I claim the foregoing as my own, I have hereto affixed my signature in the presence of two witnesses.

PEHR CHRISTIANSSON.

Witnesses:
  C. H. LARSEN,
  GEO. STROMLUND.